United States Patent [19]

Rowbottam et al.

[11] 4,315,732

[45] Feb. 16, 1982

[54] WELDING APPARATUS

[75] Inventors: Francis W. Rowbottam, Santa Barbara; Nathan L. Skinner; John O. Niswonger, both of Goleta; Milt Wadler, Santa Barbara, all of Calif.

[73] Assignee: JJNR Corporation, Los Angeles, Calif.

[21] Appl. No.: 106,395

[22] Filed: Dec. 26, 1979

[51] Int. Cl.³ .................................... F23D 13/04
[52] U.S. Cl. ................................ 431/344; 431/255; 222/103; 422/187; 422/211; 239/306; 239/328; 239/419.3
[58] Field of Search ............... 431/255, 344; 239/304, 239/306, 328, 419.3; 222/103; 422/211, 187

[56] References Cited

U.S. PATENT DOCUMENTS

| 3,253,787 | 5/1966 | Stutzman | 239/306 |
| 3,607,066 | 9/1971 | Basch et al. | 422/211 |
| 3,860,396 | 1/1975 | Finley | 431/344 |
| 3,882,223 | 5/1975 | Reinhardt | 422/211 |
| 4,133,301 | 1/1979 | Fujiwara | 431/344 |

Primary Examiner—Samuel Scott
Assistant Examiner—Lee E. Barrett
Attorney, Agent, or Firm—Fulwider, Patton, Rieber, Lee & Utecht

[57] ABSTRACT

Welding apparatus which includes a fuel container for liquefied gas, an oxygen generator, a burner nozzle, and a flow control system for conveying a controlled amount of gas and oxygen from the fuel container and oxygen generator to the burner nozzle for combustion. The oxygen generator includes a reactor which contains a catalyst for decomposing the oxygen generating compound to produce oxygen and water and accompanying heat. Heated oxygen and water from the reaction are carried to a collection chamber by a condenser system which condenses substantially all of the water. An evaporator system carries oxygen from the collection chamber to the flow control system. In one embodiment it is arranged in thermal association with the reactor so that the heat of the reaction is utilized to vaporize any water entrained in the oxygen coming from the collection chamber, thereby promoting proper combustion of the oxygen and fuel at the burner nozzle. Hydrogen peroxide is contained in a collapsible element which is progressively squeezed to release a controlled amount of the hydrogen peroxide for contact with the catalyst in the reactor. The burner nozzle assembly may include a pilot flame system, and may be integral with or remotely located relative to the oxygen generator.

21 Claims, 13 Drawing Figures

WELDING APPARATUS

BACKGROUND OF THE INVENTION

1. Field of the Invention

The present invention relates to an apparatus for use in welding, heating, brazing, and like operations.

2. Description of the Prior Art

Most welding torches are designed for sustained use and consequently employ relatively large tanks of fuel and compressed oxygen. Such torches are cumbersome and comparatively expensive for the average do-it-yourself householder. Even the compressed oxygen tanks intended for short duration home use are relatively large because the tank pressures must be kept low for safety reasons. Consequently, the supply of oxygen is quickly consumed and the user is faced with the bother and expense of periodically replacing the container. Increasing the supply of available oxygen in a small container can only be done by compressing the gas to dangerously high pressure levels that are unacceptable from a safety standpoint.

Other torches of the prior art utilize compounds which are capable of decomposition to produce oxygen, but these devices are generally cumbersome and close control of the rate of oxygen production is difficult.

SUMMARY OF THE INVENTION

According to the present invention, welding apparatus is provided which includes a fuel container, a burner nozzle, and an oxygen generating means adapted to provide relatively large volumes of oxygen at a controlled rate. In one embodiment the oxygen generating means includes an aqueous solution of hydrogen peroxide carried within a collapsible container which can be quickly replaced as needed. A pressure pad or squeezing means is operated to extrude the aqueous solution at the desired rate. On the basis of weight and volume, the collapsible container provides significantly more oxygen than a prior art tank of pressurized oxygen.

The oxygen generating means includes a reactor which contains a catalyst for decomposing the oxygen generating compound to produce the desired oxygen, water, and accompanying heat. The oxygen and water from the reactor are carried to the collection chamber of a condenser means, where cooling occurs sufficient to condense and collect most of the water produced in the reactor. An evaporator means next conveys the oxygen from the collection chamber to a flow control means for passage to the burner nozzle, the evaporator means being in thermal association with the reactor to heat and vaporize any water entrained in the oxygen being conveyed.

In one embodiment the torch includes a burner nozzle sleeve axially advanceable to facilitate formation of a pilot flame, the sleeve advancement being accompanied by actuation of a piezoelectric crystal for flame ignition.

Embodiments are disclosed in which the burner can be either an integral part of the welding assembly, or completely separate and connected only by fuel and oxygen hoses.

Various modifications and changes may be made with regard to the foregoing detailed description without departing from the spirit of the invention.

DESCRIPTION OF THE PREFERRED EMBODIMENT

Referring now to the drawings, there is illustrated a self-contained, gas-fired hand torch 10 according to the present invention and comprising, generally, a fuel container 12 for liquefied gas; an oxygen generating system 14 which includes a collapsible tube 16 containing an oxygen generating compound; a burner nozzle 18; and flow control means, generally indicated at 20, for conveying a controlled amount of gas and oxygen to the burner nozzle 18 for combustion.

Figures 1, 2:
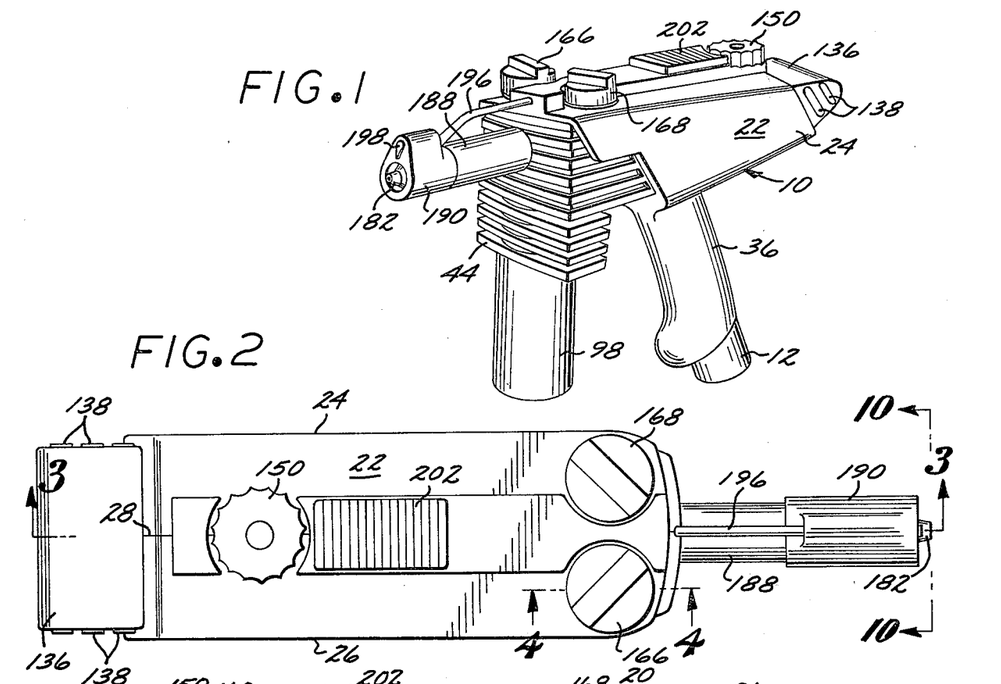
FIG. 1 is a perspective view of a hand torch according to the present invention.
FIG. 2 is an enlarged top plan view of the hand torch 54 of FIG. 1.
Figure 3:
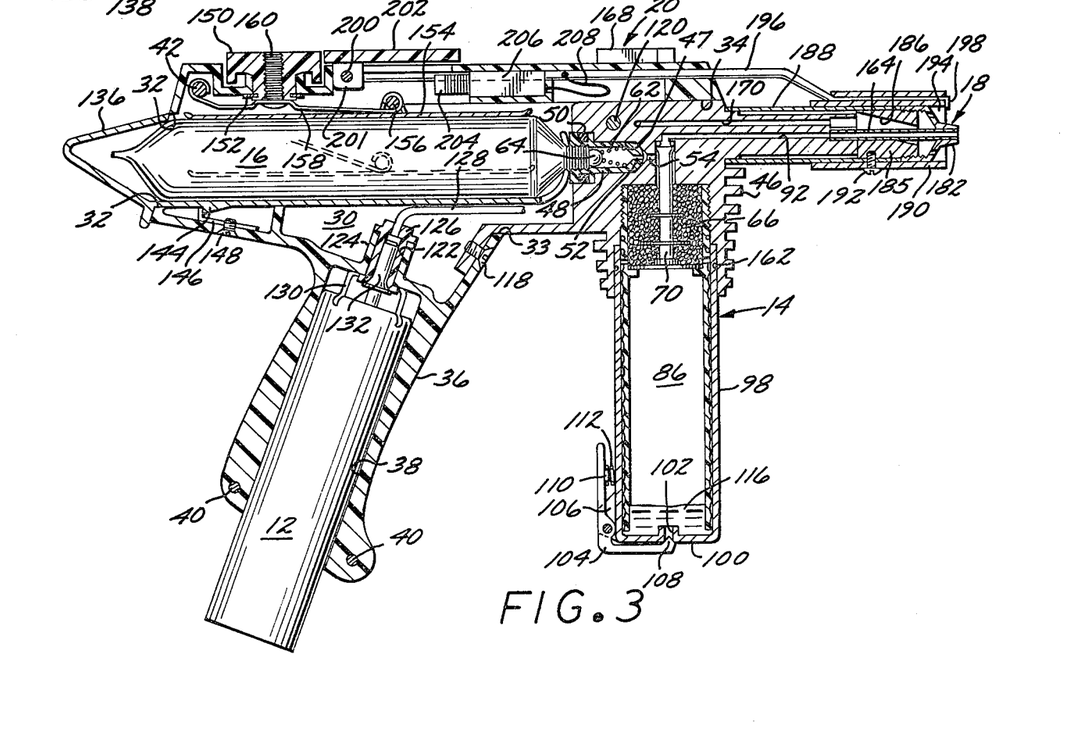
FIG. 3 is a view taken along the line 3—3 of FIG. 2.

The hand torch 10 includes a body 22 comprising body halves 24 and 26 made of suitable lightweight plastic material and mating along a mating line 28, as best seen in FIG. 2. The halves 24 and 26 define a central cavity 30 in communication with a rearward opening 32 and a forward opening whose lower margin 33 and upper margin 34 are best seen in FIG. 3.

The body halves 24 and 26 include complemental downward projections defining a hand grip 36 which includes a cylindrical cavity 38 adapted to slidably receive the fuel container 12.

A pair of fastener assemblies 40 are disposed through the halves 24 and 26 at the bottom of the hand grip 36 to secure them together, and a similar fastener 42 secures together the upper rearward portions of the halves 24 and 26.

An elongated manifold 44 constitutes the forward portion of the torch for supporting the burner nozzle 18 and portions of the oxygen generating system 14, as will be seen. The manifold 44 is preferably made of relatively high heat conductive material, such as aluminum, and is cut away or grooved to provide a plurality of heat radiating or cooling fins 46.

The manifold 44 extends across the width of the forward portion of the torch and includes a rearwardly opening cavity 47 which receives a hollow tube nozzle housing 48 forming an integral part of the tube 16. The housing 48 includes a usual O-ring 50 to provide a fluid type seating relationship with the manifold 44.

The forward end of the interior of the nozzle housing 48 includes a passage 52 adapted to fit into alignment with a passage 54 formed in the manifold 44 and communicating with a vertical manifold cavity 56 which extends downwardly into an internally threaded counterbore 58. A sleeve 60, made of heat insulating plastic material, such as polycarbonate, is threaded into the counterbore 58, as best seen in FIG. 9.

The hollow interior of the tube nozzle housing 48 includes a compression spring 62 operative to urge a ball valve 64 against the discharge opening in the forward end of the tube 16. As will be seen, squeezing the tube 16 forces a portion of its contents outwardly and moves the ball valve 64 against the bias of the spring 62, enabling the extruded contents to flow through the passages 52 and 54, through cavity 56, and into a cylindrical chamber or reactor 66, which is defined by the upper portion of the sleeve 60, the upper wall of the counterbore 58, and the circular lower plate or disk 68 of a flow director and radiator 70.

Figures 6, 7, 8, 9, 10:
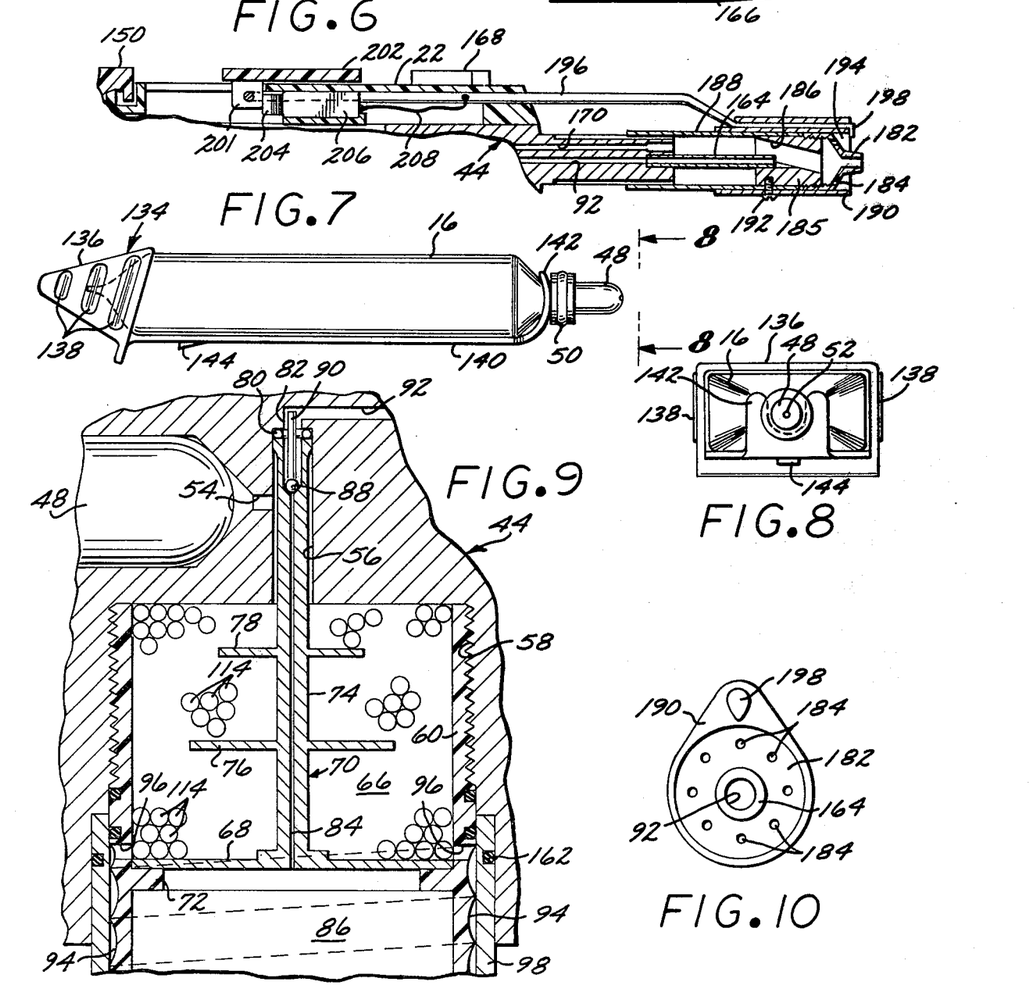
FIG. 6 is a partial cross-sectional view illustrating the burner sleeve and ignition slide in their projected positions.
FIG. 7 is a detailed side-elevational view of the tube containing the oxygen generating compound, fitted to the tube tray preparatory to insertion within the torch body.
FIG. 8 is a view taken along the line 8—8 of FIG. 7.
FIG. 9 is an enlarged detailed view of the reactor and adjacent structure shown in FIG. 3.
FIG. 10 is an end elevational view of the burner nozzle end of the hand torch.

As best seen in FIGS. 3 and 9, the disk 68 rests upon a circular flange 72 integral with the sleeve 60.

The radiator 70 includes an upwardly extending column 74 integral with the disk 68. Progressively smaller diameter, vertically spaced disks 76 and 78 integral with the column 74 radially project into the interior of the reactor 66, as illustrated.

The upper portion of the column 74 projects into the larger diameter of the vertical cavity 56, thereby defining an annular passage providing communication between the passageway 54 and the interior of the reactor 66.

The upper end of the column 74 is approximately the same diameter as the cavity 56 for a fluid tight fit, pressing against an O-ring 80 located in the upper end of the cavity 56.

The upper end of column 74 includes a vertically extending passage 82 in communication with a smaller vertical passage 84 which extends the length of the column 74 into communication with a collection chamber 86, defined by the sleeve 60 below the disk 68.

A ball valve 88 is seated against the upper end of the passage 84. A vertically elongated rod 90 located in the passage 82 rests against the ball valve 88. As will be seen, oxygen passing upwardly through the passage 84 is normally at a pressure sufficient to raise the ball 88 despite the weight of the rod 90 so that the oxygen can flow into the passage 82 and into a horizontal passage 92 formed in the manifold 44 in communication with the passage 82. The rod 90 also prevents the ball valve 88 from being carried upwardly and down the passage 92 at high oxygen flow rates as will be apparent.

The lower portion of the sleeve 60 includes a groove 94 helically extending from the reactor 66 to the lower end of the sleeve. The groove is in communication with the reactor 66 by means of a plurality of circumferentially arranged ports 96 adjacent the upper end of the groove 94.

The grooved lower portion of the sleeve 60 constitutes a condenser, as will be seen, and is slidably and closely concentrically fitted within an upwardly open heat radiating cylindrical member 98 which is closed at its lower end by a bottom wall 100 having a central opening or drain port 102.

An L-shape dump valve 104 is pivotally carried at its mid-portion by a mounting tab 106 integral with the lower extremity of the cylindrical member 98. The horizontal leg of the valve 104 includes a projection 108 aligned with the drain port 102. The other or vertical leg of the valve 104 includes an integral boss 110 surrounded by a compression spring 112 which acts against the adjacent outer surface of the clindrical member 98 to bias the projection 108 into its seated position. This normally blocks drainage through the drain port 102 of any contents in the collection chamber 86.

The reservoir 66 is filled with spherical pellets 114 of ceramic material coated with a suitable catalyst. There are a number of materials which will induce decomposition of the preferred hydrogen peroxide which fills the tube 16, but dense alumina, known in the trade as alpha alumina, coated with a platinum catalyst, has been found to perform best. A generally related coated pellet is widely used in various automobile catalytic converters for pollutant control. Suitable catalysts for effecting decomposition of hydrogen peroxide are well known to those skilled in the art and the particular composition of the catalytic pellets 114 is not a part of the present invention.

The collection chamber 86, as will be seen, constitutes the space into which the products of decomposition of the hydrogen peroxide are discharged. Oxygen and water in both liquid and vapor form pass from the reactor 66 through the ports 96, and around the helical groove 94 to the bottom of the sleeve 60. The bottom of the sleeve 60 is spaced above the bottom wall 100 of the member 98, permitting the products of decomposition to enter the chamber 86. Liquid water collects in the bottom of the chamber, as indicated at 116, and is periodically dumped by pressing the vertical leg of the valve 104 to open the port 102.

The manifold 44 is secured at its rearward lower portion to the rearward forward portion of the body halves 24 and 26 by a pair of machine screws 118, as best viewed in FIG. 3. In addition, a fastener assembly 120 is disposed through the forward portions of the halves 24 and 26, and through the upper rearward portion of the manifold 44 to secure the halves 24 and 26 and manifold 44 together.

The fuel container cavity 38 in the grip 36 communicates with a socket 122 defined by the central bore of a cylindrical boss 124 which is integral with the body halves 24 and 26, as seen in FIG. 3. The end flanges of a fuel valve fitting 126 hold the fitting 126 within the socket 122 upon assembly of the body halves 24 and 26. A fuel line 128 carried by the fitting 126 is adapted, as will be seen, to carry fuel from the container 12 to the burner nozzle 18. In addition, the fitting 126 also mounts a container retainer 130 having a plurality of resilient fingers which are adapted to fit about and press against the container 12 to retain it in position within the cavity 38.

Insertion of the container 12 within the cavity 38 in the position illustrated depresses a valve 132 integral with the container 12, releasing fuel into a fuel line 128. The fuel in the container 12 is preferably a liquefied gas having a vapor pressure greater than atmospheric. Butane has been found to be satisfactory although other suitable fuels such as propane may be used if desired. The particular fuel utilized is not critical to the present invention.

Referring to FIGS. 3 and 7, the tube 16 containing the oxygen generating compound is generally elongated and made of a collapsible material resistent to attack by the particular compound utilized. Suitable materials will suggest themselves to those skilled in the art. A preferred compound is a peroxy compound such as an aqueous solution of thirty percent hydrogen peroxide by volume.

The tube 16 contains approximately 7 ounces of the hydrogen peroxide solution. Flowing this solution into the reactor 66 at a rate of approximately 3½ drops per second will produce approximately 1 meter of oxygen per minute. This solution concentration is merely exemplary and other concentrations may be utilized according to the circumstances of the particular application.

The body of the tube 16 is made of a thin plastic material, such as the material of which toothpaste, shampoos and similar dispenser containers are made. As seen in FIG. 7, the tube 16 is cradled within a tray 134 dimensioned to slidably pass into cavity 30 through the rearward opening 32. The tray 134 includes a wedge shaped tail piece 136 having ribs 138 to facilitate gripping by the user.

An elongated skid 140 integral with the tail piece 136 extends forwardly and terminates in a circular loop 142 through which the nozzle housing 48 is adapted to fit. The rearward extremity of the tube 16 fits within the hollow interior of the tail piece 136 upon flexing of the skid 140. The skid 140 includes an integral offset detent 144 adapted to slide over an upstanding flange of a retainer clip 146 which is secured within the cavity 30 by a usual machine screw 148.

Tube 16 is easily removed from the cavity 30 by lifting the tail piece 136 to unseat the detent 144 from the clip 146, and thereafter grasping the ribs 138 and pulling the tube 16 rearwardly. A fresh tube 16 is inserted in a reverse operation to seat nozzle housing 48 in the manifold cavity 47.

Hydrogen peroxide is extruded from the tube 16 by operating an adjusting knob 150 which extends through an opening in the upper portion of the body halves 24 and 26, as seen in FIGS. 2 and 3. The knob 150 is rotatably held in position by a retainer clip 152.

An elongated pressure plate 154 overlies the tube 16, and includes an integral tab having a horizontal pin 156. The forward extremity of a spring lever 158 is pivotally looped about the pin 156. Its rearward extremity is pivotally looped about the shank of the fastener assembly 42. At approximately its mid portion, the lever 158 integrally and fixedly mounts a vertically disposed threaded stud 160. Clockwise rotation of the knob 150 moves the stud 160 and lever 158 downwardly. This moves the pressure plate 154 downwardly toward the dotted line position and squeezes out a portion of the contents of the tube 16.

Use of the collapsible tube 16 enables control of oxygen generation simply by rotation of the knob 150. The quantity of oxygen available from the hydrogen peroxide solution in the tube 16 is surprisingly large for the size of the tube, typically amounting to as much as 1.1 cubic feet. This is significantly greater than what would be available in a similarly sized cartridge of compressed oxygen.

The aqueous solution of hydrogen peroxide passing through the passage 54 flows through the cavity 56 and into the reactor 66. The flow path is labyrinthine because of the plates 78 and 76 encountered by the hydrogen peroxide during its downward percolation. The plates 78 and 77 increase the extent of contact of the hydrogen peroxide with the catalyst coated pellets 114.

In the process of percolating through the reactor 66, the hydrogen peroxide compound decomposes into oxygen and water, which is primarily in vapor form because of the elevated temperatures accompanying the decomposition reaction. The oxygen and water vapor escape from the reactor 66 through the ports 96 at its base, and enter the helical groove 94. Since the sleeve 60 is made of heat insulating material, heat transfer from the reactor 66 to the area of the groove 94 and collection chamber 86 is desirably slowed.

As the water vapor and oxygen pass downwardly through the groove 94, the grooved portion of the sleeve 60 acts as a condenser in combination with the surrounding metal member 98, condensing the major portion of the water vapor. The oxygen and liquid water pass into the chamber 86, where the water collects, as indicated at 116. The cooling of the grooved sleeve 60 is enhanced by heat transfer from the member 98 to the finned portion of the manifold 44. The cooling is such that the chamber 86 is normally at a temperature approximately twenty percent cooler than the temperature of the reactor 66.

The member 98 is slip fitted into position within the annular seat between the manifold 44 and the sleeve 60, being retained in this position by the resilience of a sealing O-ring 162. This permits easy disassembly of the member 98, but more importantly it permits the member 98 to vent any excessively high pressures in the chamber 86 by sliding downwardly and separating the manifold 44 and sleeve 60.

The heat accompanying the decomposition of the hydrogen peroxide in the reactor 86 is utilized to vaporize any water droplets which may be undesirably entrained in the oxygen in the collection chamber 86. More particularly, the oxygen and any such water droplets are heated as they pass upwardly through the passage 84. The disks 68, 76, and 78 tend to absorb much of the heat present in the reactor 66 and transfer this heat to the column 74, where it is concentrated to quickly raise the temperature of the oxygen and water passing through the passage 84. Any water droplets present are quickly converted to a vapor phase and the resultant combination of oxygen and water vapor is sufficiently preheated that combustion at the burner nozzle 18 occurs without any difficulty. In contrast, operation of the torch without the described water condensation and water vaporization has been found to result in slugs of water passing to the burner nozzle 18 and snuffing out the flame and otherwise interfering with proper combustion of the fuel-oxygen mixture.

Although not utilized in the present embodiment, a suitable sintered metal filter or the like (not shown) may be seated at the entry point to the passage 84 to block large slugs of water. Such a filter is normally unnecessary because of the operation of the radiator or evaporator 74.

The flow control means for conveying controlled amounts of butane and oxygen to the burner nozzle 18 will next be described. As best seen in FIGS. 3–6, the manifold passage 92 extends forwardly, terminating in a larger diameter cavity which seats the rearward extremity of an elongated tube 164 having an internal diameter of approximately 0.032 inches.

The volume of oxygen flow through the tube 164 is controlled by rotation of a main supply knob 166, as will be seen. A similar pilot supply knob 168 adjusts the volume of flow of fuel through an elongated pilot passage 170, approximately 0.005 inches in diameter, which terminates at the forward end of the manifold 44 adjacent the seat which receives the nozzle tube 164.

Figure 5:
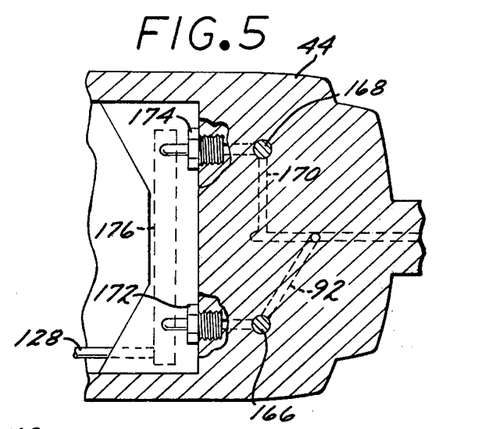
FIG. 5 is a view taken along the line 5—5 of FIG. 4.

Both passages 92 and 170 extend rearwardly and, as best seen in FIG. 5, terminate in tube fittings 172 and 174, respectively. The fittings 172 and 174 open into a manifold cavity 176 to which the fuel line 128 from the fuel container 12 is connected. Thus, once a container 12 is inserted in the torch, fuel from the manifold cavity 176 is admitted to the passage 92 by opening the supply knob 166, and is admitted to the passage 170 by opening the pilot supply knob 168.

Figure 4:
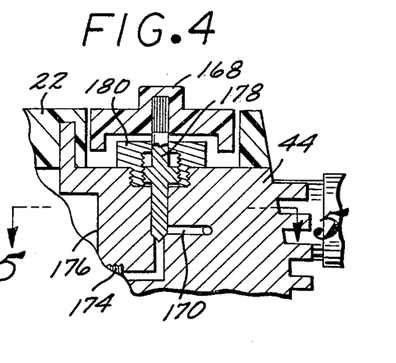
FIG. 4 is a view taken along the line 4—4 of FIG. 2.

Both knobs 166 and 168 are similarly constructed and operated, FIG. 4 illustrating knob 168 by way of example. The knob 168 is seated upon a valve stem 178 which is threadably movable upwardly and downwardly to adjust the flow through the pilot passage 170. The stem 178 is threadably movable within an internal bore of a stem retainer 180 which is threaded into an opening or seat in the upper surface of the manifold 44.

In the normal operating positions of the torch components, as seen in FIG. 3, the nozzle tube 164 closely fits within the central opening of a cylindrical aspirator fitting 182 which forms part of the assembly heretofore generally referred to as the burner nozzle 18.

The fitting 182 includes a plurality of circumferentially spaced aspirator openings 184. It further includes a skirt threadably mounted upon a cylindrical nozzle block 185. The block 185 has a relatively large diameter slanted orifice 186 open at its rearward extremity to the fuel passage 170. At its forward extremity the orifice 186 is substantially but not completely closed by the nozzle tube 164, as seen in FIG. 3.

The rearward extremity of the nozzle block 185 slidably fits within an elongated sleeve 188 which is longitudinally slidably fitted over a forwardly extending cylindrical portion of the manifold 44. The block 185 and sleeve 180 are connected together, and to an encompassing ceramic electrical insulating sleeve 190, by means of a fastener 192. The forward extremity of the sleeve 190 extends forwardly beyond the aspirator openings 184, and forms a sheltered annular recess 194 which enhances ignition of the fuel, as will be seen. The ceramic sleeve 190 includes a thickened upper portion fixedly attached to the forward extremity of a metal slide rod 196 whose tip end 198 is bent downwardly for termination close to the end of the nozzle tube 164, which is also made of metal.

With the foregoing arrangement, the assembled insulating sleeve 190, aspirator fitting 182, sleeve 188 and block 184 are longitudinally movable with the rod 196 between the operating position of FIG. 3 and the pilot flame position of FIG. 6.

With the torch components in the positions illustrated in FIG. 6, opening the pilot supply knob 168 allows butane to flow through the pilot passage 170 and into the relatively large space defined between the sleeve 188 and the tube 164. The butane follows a path through the slanted orifice 186 and into the hollow interior of the aspirator fitting 182.

The butane then flows through the central opening in the fitting 182, and by venturi action air is aspirated through the openings 184 to provide the proper stoichiometric mixture for ignition.

In the positions of the torch components shown in FIG. 3, the pilot supply knob 166 can be operated to allow a small amount of butane to flow through the passage 170, and through the small clearance space in the slanted orifice 186, to sustain a pilot flame adjacent the aspirator openings 184. Use of a pilot flame after ignition is normally not necessary, and the pilot supply knob 168 is usually closed after ignition and after the main supply knob 166 is opened, to allow oxygen and butane to flow to the nozzle tube 164 for combustion. The valve 88 acts as a check valve to prevent any butane from flowing into the chamber 86.

Rod 196 is operative to initiate ignition of the pilot flame. It is slidable through an opening in the forward extremities of the body halves 24 and 26. Its rearward extremity is attached by a pin 200 to a pair of depending tabs 201 integral with a slide 202. Movement of the slide 202 forwardly causes the tabs 201 to engage and compress the trigger 204 of a piezoelectric crystal assembly 206 which is fixed in any suitable fashion to the upper surface of the body halves 24 and 26. The crystal of the assembly 206 is electrically connected by a flexible lead 208 to the rearward extremity of the metal rod 196.

Such piezoelectric assemblies are well known in the art and are widely used to provide a momentary spark to ignite the pilot flame of home heaters and the like. Thus, upon depression of the trigger 204 an electrical charge is developed which causes a spark to jump the gap between the rod tip 198 and the adjacent metal aspirator fitting 182.

In typical operation of the hand torch 10 a fuel container 12 and hydrogen peroxide tube 16 are fitted into position so that butane fills the manifold cavity 176. The pilot supply knob 168 is next opened slightly to admit butane into the passage 170, and the slide 202 is moved forwardly to ignite the air-butane mixture and form a pilot flame at the aspirator fitting 182. This flame can be used for heating a work piece or for tasks requiring only a moderate temperature level such as soldering or brazing.

The adjusting knob 150 is next operated to extrude a controlled amount of hydrogen peroxide solution into the reactor 66. The ensuing exothermic decomposition results in relatively high temperature oxygen and water passing through the condenser groove 96. Condensed water is collected in the chamber 86 for periodic emptying by the user. The cooler oxygen and any entrained water droplets are heated by passage through the evaporator radiator 70, the entrained water being vaporized and raised to a temperature such that the resultant mixture is easily combustible.

Operation of the main supply knob 166 admits the mixture of oxygen and butane into the passage 92 for ignition by the pilot flame. The volume of butane and oxygen is appropriately adjusted to obtain the proper flame for the particular welding or other task, as previously described. Welding can continue for approximately 35 minutes under normal circumstances with the particular embodiment herein described.

Figure 11:
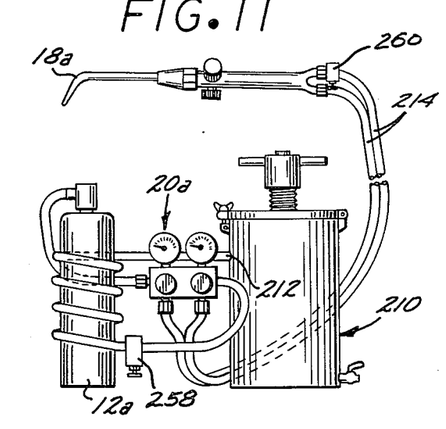
FIG. 11 is a front elevational view of another embodiment of the present welding apparatus.
Figure 12:
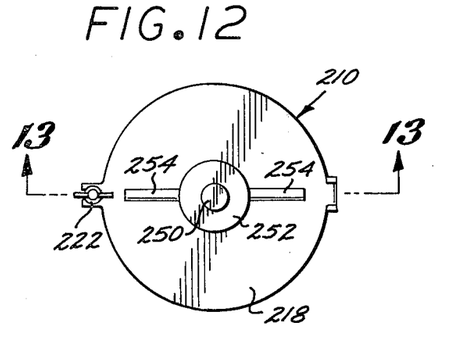
FIG. 12 is a top plan view of the oxygen generating means of the apparatus of FIG. 11.
Figure 13:
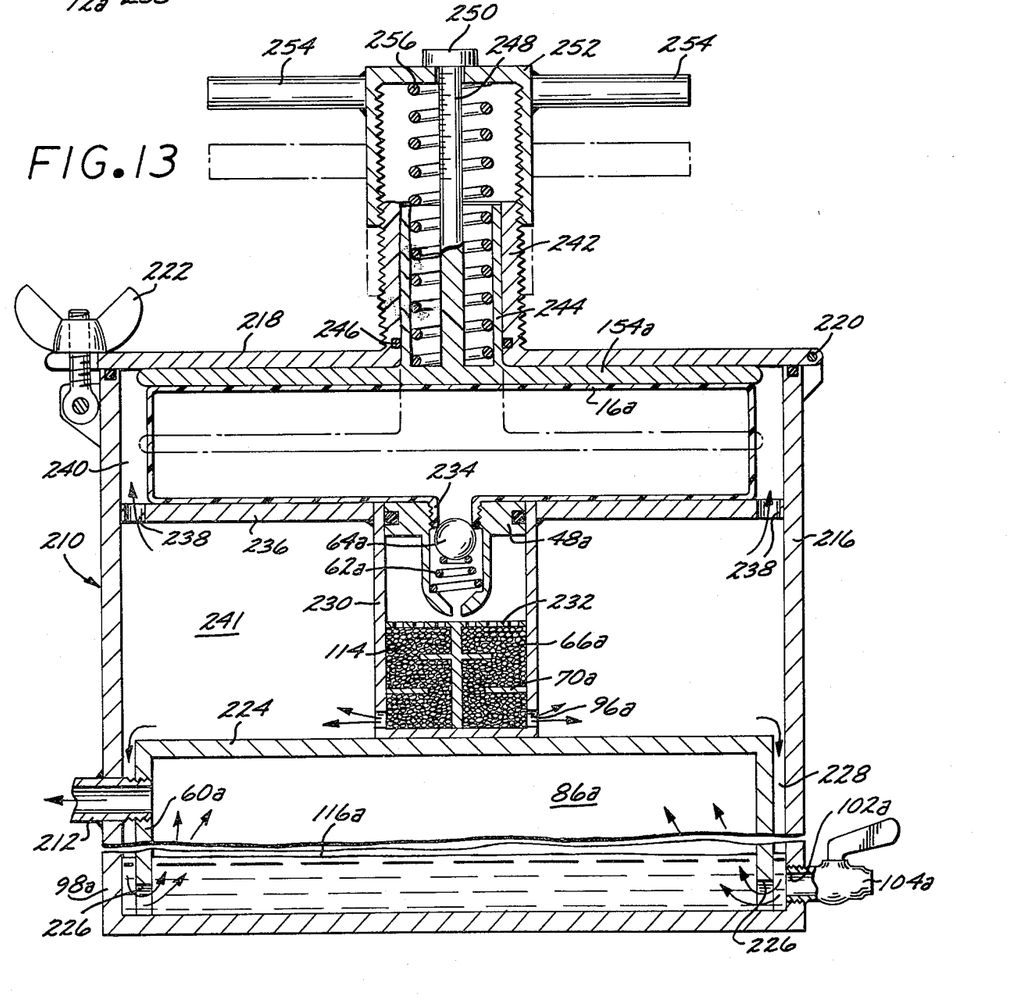
FIG. 13 is an enlarged view taken along the line 13—13 of FIG. 12.

Referring now to FIGS. 11 through 13, there is illustrated another embodiment of the present welding apparatus which utilizes an oxygen generator similar to that described in connection with the first embodiment, but in other respects the embodiment is quite different. The embodiment is intended for longer duration, professional welding tasks requiring continued generation of oxygen over extended periods of time at higher pressures, such as at approximately 27 lbs per square inch.

In those instances where the components are substantially similar in function, the parts in the second embodiment are assigned the same numeral of that of the first embodiment, but with the subscript "a".

The oxygen generator is indicated generally at 210, and generates oxygen for discharge through conduit 212 connected to a flow control means 20a. The oxygen generator 210 and a butane cylinder 12a are of sufficient capacity to provide appreciable quantities of oxygen and butane over extended periods, the generator 210 in the embodiment illustrated being approximately 12 inches high and 6 inches in diameter. The butane cylinder 12a is also of approximately the same height.

The flow control means 20a can be any of various commercially available units having control knobs and pressure regulators to convert oxygen and butane from supply pressures to operating pressures suitable for a usual and conventional gas or welding torch 18a which is connected to the flow control means by suitable hoses 214.

The oxygen generator 210 comprises a metal cylinder 216 closed at its lower end and provided at its upper end with a cover 218. The cover 218 is hinged at 220 to the cylinder 216 and is clamped in fluid tight relation to the cylinder 216 by a wing nut and fastener assembly 222.

A sleeve 60a constituting a condenser is disposed within the cylinder 216 and is closed at its upper end by an upper wall 224 to define a collection chamber 86a. The open lower end of the sleeve 60a includes a plurality of ports 226, and its diameter is less than that of the cylinder 216 to thereby define an intervening annular space 228 which can be drained by means of a manually operated drain valve 104a.

Oxygen collecting in the chamber 86a, as will be seen, is dischargable through the conduit 212, as best seen in FIG. 13.

A cylindrical sleeve 230 coaxial with the sleeve 60a rests on top of the upper wall 224, and includes an apertured partition or wall 232 defining a reactor 66a beneath it. The wall 232 includes an integral flow director 70a extending into the reactor 66a. Catalyst pellets 114 in the reactor 66a adjacent the flow director 70a, are operative to decompose hydrogen peroxide into oxygen and water vapor components for discharge out of ports 96a at the base of the sleeve 230. In a manner analagous to the operation of the oxygen generator of the first embodiment, the generated oxygen and water vapor pass out of the ports 96a and downwardly through the annular space 228, entering the collection chamber 86a by means of the ports 226.

As indicated at 116a, the water collects in the chamber 86a and is periodically drained through the valve 104a.

The surface area of the cylinder 216 and sleeve 60a are sufficiently great that water condensation is relatively complete in the annular space 228. Consequently, no additional condenser structure is normally necessary to insure that the generated oxygen is relatively free of water droplets which might interfere with combustion. However, the conduit 212 can be made of thermally conductive material such as aluminum, for example, and coiled about the fuel container 12a to provide a supplemental condenser structure. As the fuel in the container 12a is consumed, its vaporization cools the tank, reducing the temperature of the coiled conduit 212, and effecting condensation of any water vapor in the oxygen passing through the conduit 212. This condensed water vapor can be collected in one or more collection containers 258 and 260, which are provided with suitable, manually operative dump valves for periodic emptying.

The rate at which oxygen is generated is controlled by adjusting the compressive force exerted by a circular pressure member 154a underlying the cover 218 and operative upon the upper wall of a collapsible disc 16a.

The disc 16a is made of collapsible plastic material like that of which the tube 16 is made, and contains a quantity of hydrogen peroxide.

The pressure of the member 154a downwardly is operative to extrude the hydrogen peroxide out of the central port of a threaded boss 234 integral with the base of the disc 16a. The boss 234 is threaded into a tube nozzle housing 48a which also forms part of the collapsible disc assembly. The assembly includes a ball check valve 64a normally maintained in a closed position against the port 234 by means of a compression spring 62a.

In a manner analogous to the operation of the first embodiment, downward pressure upon the member 154a extrudes hydrogen peroxide past the ball valve 64a for discharge through the apertured wall 232 and into the reactor 66a.

The upper end of the sleeve 230 is rigidly attached to a horizontal wall 236 which supports the disc 16a. The wall 236 includes a plurality of peripheral ports 238 which provide communication between an annular space 240, defined between the adjacent portions of the disc 16a and the cylinder 216, and the space 241 into which oxygen and water vapor are discharged through the ports 96a. In this arrangement, the pressure member 154a is subjected to a net upward pressure from the generated oxygen which tends to oppose any mechanical force pressure exerted downwardly upon the pressure member 154a. Thus, as will be seen, a level of desired oxygen pressure can be established and maintained by adjusting the mechanical pressure exerted downwardly upon the pressure member 154a.

The cover 218 includes an externally threaded boss 242 within which is vertically slidably received a tubular upward extension 244 of the pressure member 154a. The slidable interengagement is made fluid tight by a sealing or O-ring 246.

A vertical stud 248, integral with the pressure member 154a, includes a retainer cap 250 which acts as an abutment against which the upper end of an internally threaded adjusting sleeve 252 is rotatable.

The lower end of the sleeve 252 is threaded upon the threaded boss 242, and lateral pins 254 adjacent the upper end of the sleeve 252 to enable rotation of the sleeve 252 up and down.

A compression spring 256, located within the sleeve 252 and boss 242, acts at its upper end against the upper terminus of the sleeve 252, and at its lower end against the upper side of the pressure member 154a.

Rotation of the sleeve 252 in one direction urges it downwardly against the bias of the spring 256. As a consequence, the pressure member 154a exerts greater pressure upon the disc 16a and increasing the rate of discharge of hydrogen peroxide and consequently the pressure of the generated oxygen. When the pressure of the generated oxygen exceeds a predetermined level, oxygen pressure upon the pressure member 154a moves it upwardly in opposition to the bias of the spring 256 until a balance is established between the generated oxygen pressure and the spring pressure. If a lesser oxygen pressure is desired, the sleeve 252 is rotated in the opposite direction to reduce the bias of the spring 256. In initial operation of the apparatus, the sleeve 252 is threaded downwardly into engagement with the upper surface of the cover 18. The stud 248 will project above the sleeve 252 a maximum at this time. As the hydrogen peroxide is consumed, the stud 248 will move downwardly relative to the cover 18. Indicia are provided on the stud 248 to provide an indication of the amount of hydrogen peroxide remaining.

From the foregoing it will be apparent that the present torch 10 is uniquely adapted to provide significant quantities of fuel and oxygen in both a larger, semi-portable version for use by professionals, and also in a completely integrated hand-held unit for use in performing welding or like tasks of relatively short duration. The welding apparatus is relatively simple to operate and inexpensive to maintain, and replacement containers and tubes are easily insertable to replenish the supply of fuel and oxygen as needed.

Various modifications and changes may be made with regard to the foregoing detailed description without departing from the spirit of the invention.

We claim:

1. In welding apparatus including a fuel container for liquefied gas, oxygen generating means, a burner nozzle, and flow control means for conveying a controlled amount of gas and oxygen from said container and said oxygen generating means to said burner nozzle for combustion, an improved oxygen generating means comprising:
   a reactor containing catalyst means for decomposing an oxygen generating compound to produce oxygen and water and concurrently release heat;
   supply means for supplying a controlled volume of an aqueous solution of said oxygen generating compound to said reactor for contacting said catalyst means;
   condenser means coupled to said reactor to receive and cool the oxygen and water heated by the catalytic decomposition of said oxygen generating compound, and including a collection chamber for receiving the cooled oxygen and water; and
   evaporator means for conveying oxygen and any entrained water from said collection chamber to said flow control means, said evaporation means being in thermal association with said reactor for heating and vaporizing said entrained water in the oxygen.

2. Welding apparatus including oxygen generating means according to claim 1 wherein said supply means comprises a collapsible tube containing said aqueous solution; and squeeze means for squeezing said controlled volume out of said collapsible tube.

3. Welding apparatus including oxygen generating means according to claim 2 wherein said aqueous solution is an aqueous solution of hydrogen peroxide, and said catalyst is platinum.

4. Welding apparatus including oxygen generating means according to claim 2 wherein said condenser means comprises an inner heat insulating member defining said collection chamber, an outer heat conductive sleeve adapted to radiate heat and defining an extended flow passage between said reactor and said chamber for cooling oxygen and water issuing from said reactor.

5. Welding apparatus including oxygen generating means according to claim 4 wherein said evaporator means comprises a heat conductive element extending through said reactor and including a flow passage for conveying said oxygen and any entrained water from said collection chamber to said flow control means.

6. Welding apparatus including oxygen generating means according to claim 5 wherein said heat conductive element includes heat conductive extensions projecting into said reactor for conducting heat toward said flow passage in said heat conductive element.

7. Welding apparatus including oxygen generating means according to claim 3 wherein said collection chamber of said condenser means includes a drain port, and said condenser means includes a drain valve selectively operable to drain water from said collection chamber.

8. In welding apparatus including a fuel container for liquified gas, oxygen generating means, a burner nozzle, and flow control means for conveying a controlled amount of gas and oxygen from said container and said oxygen generating means to said burner nozzle for combustion, an improved oxygen generating means comprising:
   a reactor containing catalyst means for decomposing an oxygen generating compoud to produce oxygen and water and concurrently release heat;
   a collapsible container containing an aqueous solution of an oxygen generating compound;
   pressure means for progressively collapsing said container to supply a controlled volume of said aqueous solution for contacting said catalyst means; and
   means coupling said reactor to said flow control means to receive the oxygen generated by the catalytic decomposition of said oxygen generating compound, and to convey said generated oxygen to said burner nozzle.

9. Welding apparatus including oxygen generating means according to claim 8 wherein said collapsible container contains an aqueous solution of hydrogen peroxide and said catalyst means comprises a platinum coating on a plurality of pellets.

10. A self contained, gas-fired hand torch comprising:
    a torch body including an oxygen supply tube cavity having an insertion opening, and further including a handle grip having a fuel container cavity provided with a fuel container discharge socket for receiving the discharge portion of a fuel container;
    a container sled for mounting a collapsible oxygen supply tube and adapted for insertion into said container cavity by means of said insertion opening; and
    pressure means for progressively collapsing a collapsible oxygen supply tube to supply a controlled volume of the contents of the oxygen supply tube;
    a manifold assembly attached to said torch body and including a supply tube discharge socket for receiving the discharge portion of an oxygen supply tube; a burner nozzle tube; oxygen generating means; and passage means connecting said supply tube discharge socket to said oxygen generating means for conveying the discharged contents of an oxygen supply tube to said oxygen generating means, said passage means further connecting said oxygen generating means to said burner nozzle tube.

11. A hand torch according to claim 10 and including pressure means mounted to said torch body for engagement with said collapsible oxygen supply tube, and operable to squeeze a controlled amount of the contents of said supply tube into said supply tube discharge socket.

12. A hand torch according to claim 10 and including:
    an aspirator fitting having a normal position wherein a central opening thereof receives the forward end of said burner nozzle tube, and further having a skirt portion defining a recess with said burner nozzle tube, and further having air aspirator openings opening into said recess;

pilot passage means in said manifold connecting said container discharge socket and said recess for conveying fuel to said recess; and slide means longitudinally slidably mounting said aspirator fitting to said torch body and operative to move said aspirator fitting forwardly from said normal position to a pilot position wherein said nozzle tube is withdrawn from said aspirator fitting central opening whereby fuel may flow through said aspirator fitting central opening and aspirate air into said recess through said aspirator openings to provide a combustible mixture for ignition.

13. A hand torch according to claim 12 and including electric spark discharge means disposed between said torch body and said slide means for operation upon movement of said aspirator fitting to said pilot position for ignition of said combustible mixture.

14. A hand torch according to claim 10 wherein said oxygen supply tube contains an aqueous solution of hydrogen peroxide, and wherein said oxygen generating means comprises:

a heat insulating sleeve mounted to said manifold and having an upper portion constituting a reactor in communication with that portion of said passage means connected to said supply tube discharge socket whereby said aqueous solution is enabled to flow into said reactor, said reactor being filled with catalyst coated elements operative to decompose said aqueous solution into water and oxygen, said sleeve including a lower portion having an exterior groove extending helically from said reactor to the bottom of said lower portion; a vertically elongated heat conducting cylinder open at the top to closely receive said sleeve whereby said groove constitutes a path for said water and oxygen, said cylinder being connected in heat conductive relation with said manifold to enhance heat transfer from said sleeve, said cylinder being closed at its bottom to define a collection chamber in said lower portion in communication with the lower end of said groove; and heat conductive means in said reactor defining the upper terminus of said collection chamber and including a central passage extending between said collection chamber for conveying oxygen and any entrained water through said reactor to said passage means.

15. A hand torch according to claim 14 wherein said bottom of said cylinder includes a drain port, and including manually operative drain valve means for draining said collection chamber through said drain port.

16. A hand torch according to claim 14 wherein said cylinder is press fitted within a socket in said manifold and is adapted to separate from said manifold upon development of a predetermined pressure in said collection chamber.

17. A hand torch according to claim 14 wherein said heat conductive means includes a vertical column defining said central passage, and further includes laterally extending heat conductive portions operative to convey heat to said vertical column from portions of said reactor remote from said vertical column, said heat conductive portions being further operative to constrain said aqueous solution to follow a circuitous path through said reactor.

18. In welding apparatus including a fuel container for liquefied gas, oxygen generating means, a burner nozzle, and flow control means for conveying a controlled amount of gas and oxygen from said container and said oxygen generating means to said burner nozzle for combustion, an improved oxygen generating means comprising:

a reactor containing catalyst means for decomposing an oxygen generating compound to produce oxygen and water and concurrently release heat;

collapsible supply means for supplying a controlled volume of an aqueous solution of said oxygen generating compound to said reactor for contacting said catalyst means;

pressure means for progressively collapsing said collapsible supply means to supply a controlled volume of said aqueous solution for contacting said catalyst means, said pressure means including a pressure member engaged upon said supply means, and including bias means operative upon said pressure member to exert a dispensing pressure upon said supply means, said pressure member being in fluid communication with said oxygen generated in said reactor whereby the pressure of said oxygen opposes said dispensing pressure thereby to regulate said dispensing pressure according to said pressure of said oxygen; and means coupling said reactor to said flow control means to receive the oxygen generated by the catalytic decomposition of said oxygen generating compound, and to convey said generated oxygen to said burner nozzle.

19. Welding apparatus including oxygen generating means according to claim 18 wherein said collapsible supply means contains an aqueous solution of hydrogen peroxide and said catalyst means comprises a platinum coating on a plurality of pellets.

20. Welding apparatus including oxygen generating means according to claim 18 wherein said burner nozzle is located remotely of said oxygen generating means and said fuel container, and said flow control means comprises connecting hoses from said fuel container and said reactor, respectively.

21. In welding apparatus including a fuel container for liquefied gas, oxygen generating means, a burner nozzle, and flow control means for conveying a controlled amount of gas and oxygen from said container and said oxygen generating means to said burner nozzle for combustion, an improved oxygen generating means comprising:

a reactor containing catalyst means for decomposing an oxygen generating compound to produce oxygen and water and concurrently release heat;

supply means for supplying a controlled volume of an aqueous solution of said oxygen generating compound to said reactor for contacting said catalyst means;

condenser means coupled to said reactor to receive and cool the oxygen and water heated by the catalytic decomposition of said oxygen generating compound, and including a collection chamber for receiving the cooled oxygen and water; and evaporator means for conveying oxygen and any entrained water from said collection chamber to said flow control means.

* * * * *